United States Patent
Kennedy et al.

(10) Patent No.: US 7,490,244 B1
(45) Date of Patent: Feb. 10, 2009

(54) BLOCKING E-MAIL PROPAGATION OF SUSPECTED MALICIOUS COMPUTER CODE

(75) Inventors: Mark Kennedy, Redondo Beach, CA (US); William E. Sobel, Stevenson Ranch, CA (US); Bruce McCorkendale, Manhattan Beach, CA (US); Carey Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 900 days.

(21) Appl. No.: 10/941,527

(22) Filed: Sep. 14, 2004

(51) Int. Cl.
*H04L 9/00* (2006.01)

(52) U.S. Cl. .......................... 713/188; 726/22; 726/23; 726/24; 726/25

(58) Field of Classification Search .................. 713/188
See application file for complete search history.

(56) References Cited

U.S. PATENT DOCUMENTS

| | | | |
|---|---|---|---|
| 5,675,710 A | 10/1997 | Lewis |
| 5,826,249 A | 10/1998 | Skeirik |
| 6,023,723 A | 2/2000 | McCormick et al. |
| 6,052,709 A | 4/2000 | Paul |
| 6,072,942 A | 6/2000 | Stockwell et al. |
| 6,161,130 A | 12/2000 | Horvitz et al. |
| 6,167,434 A | 12/2000 | Pang |
| 6,253,169 B1 | 6/2001 | Apte et al. |
| 6,298,351 B1 | 10/2001 | Castelli et al. |
| 6,324,569 B1 | 11/2001 | Ogilvie et al. |
| 6,347,310 B1 | 2/2002 | Passera |
| 6,370,526 B1 | 4/2002 | Agrawal et al. |
| 6,397,200 B1 | 5/2002 | Lynch et al. |
| 6,397,215 B1 | 5/2002 | Kreulen et al. |
| 6,421,709 B1 | 7/2002 | McCormick et al. |
| 6,424,960 B1 | 7/2002 | Lee et al. |
| 6,442,606 B1 | 8/2002 | Subbaroyan et al. |
| 6,456,991 B1 | 9/2002 | Srinivasa et al. |
| 6,502,082 B1 | 12/2002 | Toyama et al. |
| 6,505,167 B1 | 1/2003 | Horvitz et al. |
| 6,643,685 B1 | 11/2003 | Millard |
| 6,650,890 B1 | 11/2003 | Irlam et al. |
| 6,691,156 B1 | 2/2004 | Drummond et al. |
| 6,701,347 B1 | 3/2004 | Ogilvie |
| 6,711,608 B1 | 3/2004 | Ogilvie |
| 6,757,713 B1 | 6/2004 | Ogilvie et al. |

(Continued)

OTHER PUBLICATIONS

Stolfo, S., et al, 'Detecting Viral propagations Using Email Behavior Profiles', ACM TOIT, 2004, entire document, http://www1.cs.columbia.edu/~kewang/paper/TOIT-EMT-101603.pdf.*

(Continued)

*Primary Examiner*—Kambiz Zand
*Assistant Examiner*—Ronald Baum
(74) *Attorney, Agent, or Firm*—Fenwick & West LLP

(57) ABSTRACT

Methods, apparatuses, and computer-readable media for preventing the spread of malicious computer code. An embodiment of the inventive method comprises the steps of: identifying (110) a computer application that is data mining an e-mail address; determining (130) whether the computer application associates at least one executable application and the data mined e-mail address with an e-mail message (120); and blocking (140) the transmission of the e-mail message when the e-mail message is associated with the at least one executable application and the data mined e-mail address.

37 Claims, 3 Drawing Sheets

U.S. PATENT DOCUMENTS

| | | | |
|---|---|---|---|
| 6,757,830 | B1* | 6/2004 | Tarbotton et al. ............ 713/188 |
| 6,851,058 | B1* | 2/2005 | Gartside ....................... 726/24 |
| 6,898,715 | B1* | 5/2005 | Smithson et al. .............. 726/24 |
| 7,237,008 | B1* | 6/2007 | Tarbotton et al. ............ 709/206 |
| 2002/0038308 | A1 | 3/2002 | Cappi |
| 2002/0087641 | A1 | 7/2002 | Levosky |
| 2002/0087649 | A1 | 7/2002 | Horvitz |
| 2002/0138525 | A1 | 9/2002 | Karadimitriou et al. |
| 2002/0138581 | A1 | 9/2002 | MacIntosh et al. |
| 2002/0147694 | A1 | 10/2002 | Dempsey et al. |
| 2002/0147782 | A1 | 10/2002 | Dimitrova et al. |
| 2002/0199186 | A1 | 12/2002 | Ali et al. |
| 2002/0199194 | A1 | 12/2002 | Ali |
| 2003/0033587 | A1 | 2/2003 | Ferguson et al. |
| 2003/0149726 | A1 | 8/2003 | Spear |
| 2003/0191969 | A1 | 10/2003 | Katsikas |
| 2003/0200334 | A1 | 10/2003 | Grynberg |
| 2003/0220978 | A1 | 11/2003 | Rhodes |
| 2004/0003283 | A1 | 1/2004 | Goodman et al. |
| 2004/0054741 | A1* | 3/2004 | Weatherby et al. .......... 709/206 |
| 2004/0064734 | A1 | 4/2004 | Ehrlich |
| 2004/0068534 | A1 | 4/2004 | Angermayr et al. |
| 2004/0073617 | A1 | 4/2004 | Milliken et al. |
| 2004/0093383 | A1 | 5/2004 | Huang et al. |
| 2004/0093384 | A1 | 5/2004 | Shipp |

OTHER PUBLICATIONS

Dyck, Timothy, Review: Teros-100 APS 2.1.1, [Online] May 28, 2003, [Retrieved from the Internet on Oct. 6, 2004] Retrieved from the Internet: <URL: http://www.eweek.com/article2/0,1759,1110435,00.asp>, Woburn, MA, U.S.A.

CAUCE.org web pages [online] Coalition Against Unsolicited Commercial Email [retrieved Mar. 17, 2003] Retrieved from the Internet: <URL: http://www.cauce.org/about/problem.shtml>.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Technical Responses to Spam," Nov. 2003, Taughannock Networks.

Kularski, C. "Compound Procedures for Spam Control," Highland School of Technology, Jan. 2004.

NBEC/NWOCA Anti-Spam Tools, [online] [retrieved Jul. 7, 2004] retrived from http://home.nwoca.org, Jul. 7, 2004.

* cited by examiner

BLOCKING E-MAIL PROPAGATION OF SUSPECTED MALICIOUS COMPUTER CODE

TECHNICAL FIELD

The present invention relates to a method for controlling the spread of malicious computer code, and more particularly to a method by which the spread of malicious code transported between computers as attachments to electronic messages can be controlled by detecting the mining of electronic address information.

BACKGROUND ART

A computer virus is malicious computer code consisting of a list of executable instructions. For purposes of this application, malicious computer code includes computer code commonly referred to as computer viruses, worms, Trojan horses, some forms of spam, spy-ware, and any other type of unauthorized or unsolicited computer code that appears in a computer without an authorized user's knowledge and/or without an authorized user's consent. Although not typically referred to as malicious computer code, spoofing, such as DNS or return address spoofing, may be the result of malicious computer code. Instructions from such code can often take the form of an executable file. Extensions for executable content vary from platform to platform and may include binary or scripting/macro forms. While the descriptions herein may use examples specific to the Windows® platform, their use is not intended to limit the present invention in any way. It is contemplated that the present invention is equally applicable to analogous mechanisms on other platforms. Malicious code of this type often has multiple objectives. One objective is typically to infect and disrupt the computer in which the malicious code resides. Such malicious code may destroy the contents of memory, corrupt data, display erroneous information, or relinquish control of the computer to a remote user. To accomplish this, the malicious code must be loaded into memory (RAM) and subsequently run.

A secondary and equally important objective of many malicious programs is to proliferate itself and spread to other computers. The most likely transmission media for this conveyance is the Internet. Malicious code can be transported to other unsuspecting computers as attachments to e-mails or instant messages sent from the infected computer. A worm is a piece of software that uses computer networks, social engineering, and/or security holes to replicate itself. Malicious code of this type exploits the computer's inherent networking capabilities. One class of worms is the e-mail worm. Such worms work by attaching a copy of the worm's executable code in the form of an .EXE file to an e-mail. The e-mail is then mailed to e-mail addresses contained in an address book or similar list found in the infected computer. Once sent, an unsuspecting user may open the e-mail, launch the attachment, and the process is repeated by subsequently infected computers when the e-mail attachment is executed.

To the recipient, the message and corresponding worm often appears to have been sent by a familiar source. As the worm targets addresses that are frequented by the computer's owner, e-mails of this type are not necessarily considered out of the ordinary by the recipient. The deception can be further enhanced by adding a suitably benign message to the e-mail. E-mail worms that require no action on the part of the recipient (such as opening the e-mail attachment) to install and activate the malicious code are especially threatening. For instance, some e-mail clients, such as Outlook Express™ and Outlook™, support a preview pane that displays the current selected message in a user's inbox in a small window on the screen. Such a preview can often result in execution of the attached malicious code and is often sufficient to install and activate a worm even if the user has not explicitly read the message.

The Melissa virus made spectacular use of the e-mail transport in 1999 when it quickly spread throughout the Internet. Melissa spread in Microsoft Word™ documents sent via e-mail. Anyone who downloaded the document and opened it triggered the virus. The virus then sent the document (and therefore the virus itself) in an e-mail message to the first 50 people in the user's address book. The e-mail message contained a deceptively friendly note that included the user's name, so the recipient would open the document thinking it was harmless. As a result, the virus then generated 50 new messages from the recipient's computer. In short order, the Melissa virus became the fastest-spreading virus of its day.

Likewise, in September of 2001 the NIMDA spread itself over email and through a number of other vectors. This virus took the form of an executable file (.EXE file) that, when executed, harvested email addresses from the victim's address book as well as from HTML (web page) and other files on the user's computer to identify new targets (the worm used many other unrelated techniques as well to find new targets). The NIMDA virus took advantage of a vulnerability found in Microsoft Outlook email software to auto-launch the worm when the user reads or previews the email; the worm will run without the user ever double-clicking on the infected attachment.

While many viruses rely on human activity to distribute the underlying code, a worm can transport itself from one computer to another without human intervention. For example, the Code Red worm replicated itself to over 250,000 vulnerable hosts in approximately nine hours in 2001. Worms of this type use up computer time and network bandwidth, and often possesses an underlying evil intent such as a denial-of-service goal. In response to this threat, many techniques have been developed to combat the spread and debilitating effects of malicious computer code. The first line of defense is to discover the malicious code upon its arrival and prevent it from replicating and propagating to other computers. Microsoft Corporation provides some of the most widely utilized e-mail and networking software in the world, and products such as Microsoft Outlook™ and Outlook Express™ are common both in business settings and in homes. Because of their popularity, and for a variety of other reasons, Microsoft's products are a popular target of the creators of malicious code. One of Microsoft's answers to this threat has been to isolate a user's contacts and associated e-mail addresses to prevent worms from easily transporting an undetected virus to other computers. By preventing the virus the ability to identify new targets, its effect is diminished. But, as computers store increasingly more information, e-mail addresses and other targeting information may be found in many different information sources around the computer beyond the typical e-mail address database. Worms no longer need to rely on a single source database to develop their new lists of victims.

The primary technique used to detect viruses and worms is signature-based detection. In this approach, the antivirus product maintains a database of thousands of fingerprints. To detect malicious software, the antivirus software searches for these fingerprints in files that are on the computer. Such signature-based technologies have advanced considerably over the past 15 years, and can even detect polymorphic and metamorphic (self mutating) threats. Despite these advances in virus detection, some new viruses are resistant to detection, and signature based detection has its limits. A fundamental limitation of signature-based virus detection is that, until the database of signatures is updated for a new virus, that virus will go undetected. As a result, such anti-viral software does not adequately ensure against infection or replication of new, fast spreading, and damaging viruses. It would therefore be desirable to prevent the transport of infected software code before it is recognized to contain malicious code and avoid one or more of the problems identified above.

DISCLOSURE OF INVENTION

Methods, apparatuses, and computer-readable media for preventing the spread of malicious computer code. An embodiment of the inventive method comprises the steps of: identifying (110) a computer application that is data mining an e-mail address; determining (130) whether the computer application associates at least one executable application and the data mined e-mail address with an e-mail message (120); and blocking (140) the transmission of the e-mail message when the e-mail message is associated with the at least one executable application and the data mined e-mail address.

BRIEF DESCRIPTION OF THE DRAWINGS

These and other more detailed and specific objects and features of the present invention are more fully disclosed in the following specification, reference being had to the accompany drawings, in which.

DETAILED DESCRIPTION OF THE PREFERRED EMBODIMENTS

Figure 1:
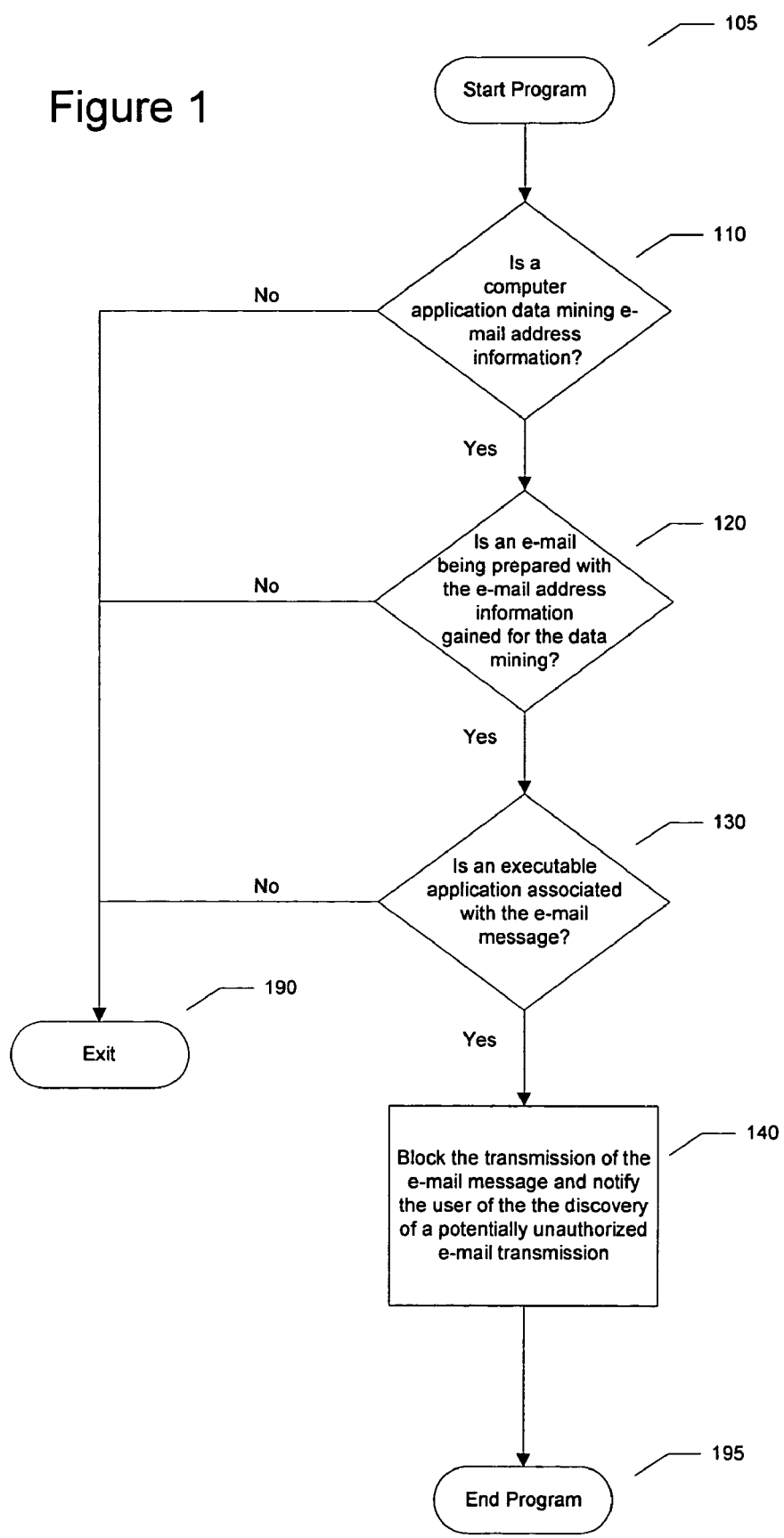
FIG. 1 is a flow diagram depicting a method for blocking the transmission of e-mails suspected of containing malicious computer code.

The present invention uses behavior blocking techniques to recognize the behavior of self replicating malicious code as it attempts to propagate itself by e-mailing an executable file to at least one e-mail address found in computer files. The blocking behavior monitors running applications for malicious code-like behavior and blocks the transmission of resulting e-mails before the messages are sent.

The present invention offers the following advantages over the prior art:

- an ability to detect self replicating and self propagating behavior of malicious computer code before the malicious computer code has been included into current heuristic or non-heuristic virus scanners;
- an ability to reduce or prevent the spread of unknown malicious code; reduced false positive restrictions of legitimate e-mail transmissions having executable applications that are not malicious; and
- increased user satisfaction with regard to protection against new malicious computer code.

An e-mail worm is malicious computer code that spreads to other computers through the unapproved use of the infected computer's e-mail system. Many e-mail worms propagate themselves by accessing the address book of a user's e-mail software and force the unauthorized transmission of copies of the virus to many if not all the user's contacts. As preventive measures have become more sophisticated, worms have begun seeking e-mail addresses found in files other than a user's address book. E-mail addresses are known to exist in a number of files outside of the typical e-mail software including EML files, HTML files, and DBX files. Furthermore, addresses associated with instant messaging and similar applications may be harvested in a similar fashion by worms wishing to spread through these alternative communications mechanisms (e.g. instant messaging). In the context of the present invention, e-mail address information should be interpreted to represent any type of electronic addressing information that will facilitate electronic communication. Electronic address information includes addresses used by an electronic messaging system. Electronic messaging systems allow transmission over a network of messages containing text and or data between users identified by an electronic messaging system specific address. Email and instant messaging are examples of electronic messaging systems. Email addresses and instant messaging addresses are examples of electronic address information.

The present invention monitors files known to contain or likely to contain e-mail addresses to determine if they are opened, read, and/or if the e-mail address information extracted. If a subsequent e-mail, instant message, or similar communication is prepared and associated with an executable application, the behavior is likely that of malicious code and the transmission of the e-mail, instant message, or the like is blocked. Indeed, the present invention contemplates blocking the transmittal of malicious computer code occurring through the mining of any electronic addressing information including e-mail and instant messaging, generating an electronic communication, and using that communication to convey malicious code.

FIG. 1 is a flow diagram of one embodiment of a method for blocking the propagation of undetected malicious computer code. The blocking behavior embodied in the present method begins in step 110 with a monitoring module 380 monitoring files to identify data mining of an e-mail address or e-mail address related information by a computer application. Files that are known to possess or likely to possess e-mail address data are recorded and monitored. Data mining, as can be appreciated by one skilled in the art, can take many forms. Accordingly, this block is expanded and subsequently discussed in connection with FIG. 2. Returning to FIG. 1, in the instance that data mining of e-mail addresses is taking place, the method determines in step 120 whether an acquired e-mail address or e-mail address information is used to prepare an e-mail message for transmission.

The preparation of an e-mail message may occur though the computer's default e-mail application, may be formed directly by the running application responsible for the data mining, or through other means known to one skilled in the art. It is contemplated that data mining comprises ascertaining information from at least one file and combining the information to recreate existing or viable e-mail addresses. Following standard protocols, the application conducting the data mining operation can create a workable e-mail message that is acceptable for transmission. The creation of at least one e-mail from the e-mail addresses found through data mining also alerts the monitoring module 380 to determine in step 130 whether an executable application is associated with the e-mail. This association may be in the form of attaching the executable application, a copy of the executable application, or an executable application that is substantially similar to the original application, to the e-mail message, embedding the application in the text of the message or any other means known to one skilled in the art that an executable application can accompany an e-mail message.

The executable application can be in many forms including EXE files, document files, and visual basic scripting files. For the purposes of this document an executable application is any file providing computer readable instructions in a format that a computer can execute either directly or indirectly. An executable file is another name for a program. Files with extensions such as EXE, DLL, and JAR often contain executable code to allow the computer system to identify and interact with the file. Scripts and other interpreted code are not directly executable by a computer, as they require an interpreter and/or a runtime environment, but fall within the applicability of the present invention. It is contemplated that the present invention is equally applicable to executable native programs as well as scripts, macros, batch languages, interpreted languages, byte code languages like Java and C# and Visual Basic, and any similar program considered by one skilled in the art to run on the computer, whether directly executed by the CPU or by a program (or component of a program such as a macro or script interpreter) whose purpose is to enable their extension. Furthermore, many files are self extracting and upon opening the file, executable instructions are revealed that may contain malicious code. Files associated with applications such as Microsoft Word™ and Microsoft Excel™ can contain macros that house a virus. A list of extensions and a brief description of the file type associated with each extension can be found at http://filext.com/alphalist.php?extstart=%5EA.

The combination of data mining for e-mail addresses, fashioning an e-mail message, and associating it with an executable file is consistent with the behavior of worms. In the instance that steps 110 through 130 are affirmatively observed, the likely existence of a worm is declared and the transmission of the e-mail is blocked in step 140. In alternative embodiments, a notification that an e-mail message has been blocked is generated and sent to a human user. The user may then elect to allow the transmission of the e-mail or retain the blocking recommendation. Furthermore, it is contemplated that the degree of scrutiny imposed by the method can be adjusted by a user to conform to personal or structural security concerns. Environments that commonly use various forms of data mining may relax the determination of what constitutes a suspected inquiry into e-mail addresses, while enterprises that are privacy sensitive may elect for employing more stringent criteria.

Figure 2:
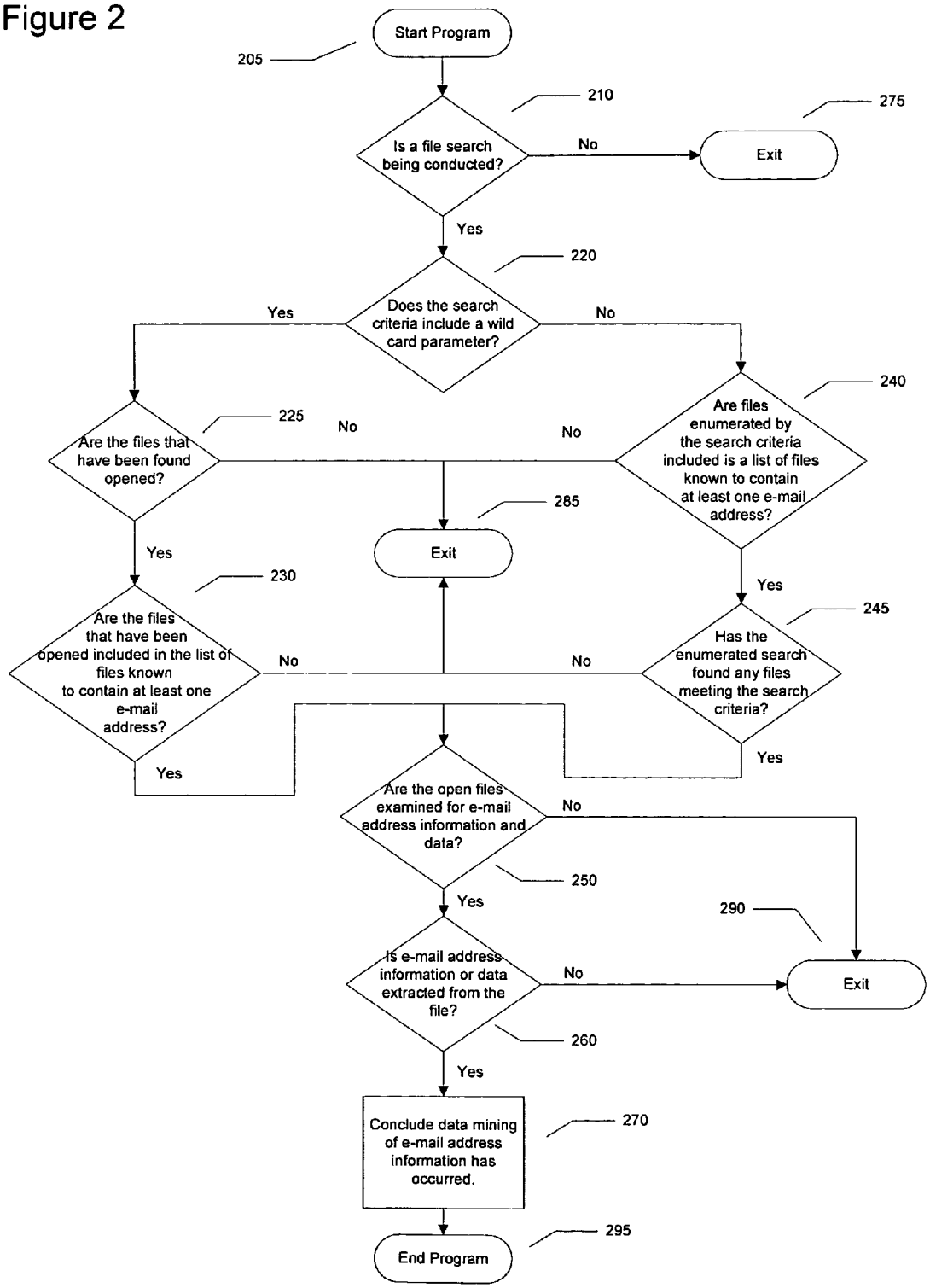
FIG. 2 is a flow diagram depicting one embodiment of data mining as used in a method for blocking the transmission of e-mail messages suspected of containing malicious computer code.

FIG. 2 depicts a flow diagram describing the detection of data mining as first introduced in block 110 of FIG. 1. In one embodiment, the steps shown in FIG. 2 are wholly captured by step 110 of FIG. 1. For the purposes of this application, data mining is defined as a process that searches for a type of desired information. One embodiment of data mining includes finding a file or repository of information, opening the file, extracting the desired information, and closing the file. In such a manner e-mail addresses or information relating to e-mail addresses can be gained from word processing documents, spreadsheets, cached web pages, or other files. Many working documents contain an e-mail address, addresses, or information relating to e-mail addresses. This information may include the domain name or structure used by an e-mail message. Data mining is often transparent, leaving little evidence of the process. As one skilled in the art will appreciate, data mining techniques and methods to protect information from such intrusion are rapidly evolving. Data mining is, therefore, a broad term that should be interpreted to encompass these and other data collection techniques, as is known to one skilled in the relevant art.

Data mining and file searching have many legitimate applications as well. To prevent the occurrence of a false positive situation resulting in the needless blocking of legitimate e-mails, the method employs several layers of examination before it is determined that malicious computer code is responsible for the data mining operation.

As shown in FIG. 2, the detection of data mining begins with the observation in step 210 that a file search is taking place. The search may be enumerated by file type or it may use a wild card search string such as the *.* format. At step 220, the method explores two options by examining whether a wild card search string is used to identify specific file types. If a wild card search has been conducted, the method observes at step 225 whether any of the located files are being opened. At step 230 the types of the files opened are compared with a list of files known to contain at least one e-mail address or some e-mail address information. If any of the open file types match the list, the method proceeds to the next step. If the response to the query presented in steps 225 or 230 is negative, the program concludes that data mining is not taking place. In an alternative embodiment, the search for electronic address information is observed without regard to the type of files being opened.

If at step 220 the search does not use wild cards but is for enumerated file types, the method proceeds with step 240 where it compares the enumerated files sought for by the search string to the list of files and file types known to contain e-mail address information. If the enumerated search is looking for file types that are known to contain e-mail address information, the method then observes at step 245 whether any such files have been located and opened. As before, if steps 240 or 245 are answered in the negative, the program concludes that data mining is not taking place. If a file is located and opened, the method then examines what type of information is being sought.

If the search has identified and opened files that are known to contain e-mail address information, the method observes at step 250 whether a search within the file is conducted for e-mail address related information such as e-mail addresses or the format of e-mail addresses. If at step 260, e-mail address information is extracted, or alternatively if any information is read that includes e-mail address information, the program concludes at step 270 that data mining of e-mail address related information has occurred. In an alternative embodiment the program considers if anything read from the file contains e-mail address information. The e-mail address information may include an e-mail address, but as one skilled can appreciate it may also include information that may allow a program to recreate or fashion workable e-mail addresses. Information such as domain names, naming structure, affiliated organizations, abbreviations of names, substrings of individual names and other information may allow a program to identify patterns in e-mail addresses and form rules by which a program may recreate or construct viable e-mail addresses.

Figure 3:
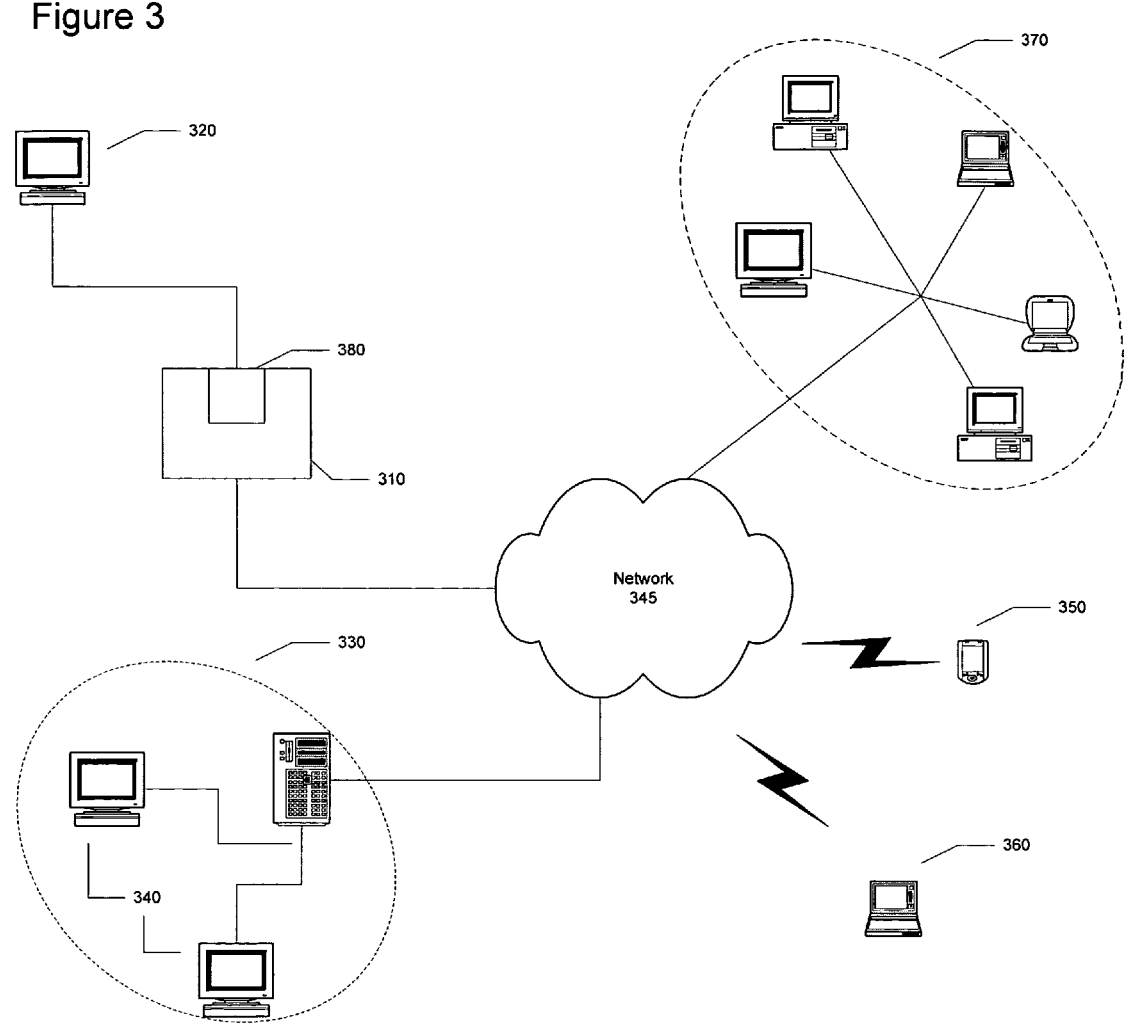
FIG. 3 is a block diagram of apparatus for blocking the transmission of e-mail suspected to possess malicious computer code

FIG. 3 is a block diagram of apparatus for blocking the transmission of e-mail to a network suspected to possess malicious computer code. A proxy module 310 is interposed between a client computer 320 and a server computer 330. The server computer 330 is in communication with other client computers 340 and is in communication with a network 345 such as the a Local Area Network (LAN), a Wide Area Network (WAN), the Internet through a variety of means known by one skilled in the art. Such networking environments are well known in offices, enterprise-wide computer networks, intranets and the Internet. The network 345 provides communicative access to other server computers 350, individual client computers 360, and other networks 370.

In an alternative embodiment, when a file is accessed, the present invention scans the file to determine if it contains any electronic address information such as email addresses. When it does, the address information can be added to a list of electronic address data. When a suspect program then sends an email, with an executable attachment, to any electronic addresses found in the file, an alert can be generated.

In a LAN networking environment, the personal client computer 320 may be connected to the network 345 through an adapter or other network interface. When used in a WAN networking environment, the client computer 320 often includes a modem or other device for establishing communications over the WAN/Internet. In a networked environment, program modules, application programs, or data, or portions thereof, can be stored in the client computer 320, such as in the disk drive. Those skilled in the relevant art will readily recognize that the network connections shown in FIG. 3 are only some examples of establishing communication links between computers, and other links may be used, including wireless links. In general, while hardware platforms, such as the client computer 320 and server computer 330, are described herein, aspects of the invention are equally applicable to nodes on a network having corresponding resource locators to identify such nodes.

The proxy module 310 includes a monitoring module 380 that is adapted to identify and monitor a computer application that is data mining for e-mail address information including e-mail addresses. The monitoring module 380 determines whether e-mail address information from the client computer 320 is being mined to prepare an e-mail message containing an associated executable application for transmission to the network 345. If it concludes that such an e-mail is being fashioned, the module 380 blocks the transmission of the e-mail, preventing the associated executable application from propagating throughout the network 345. Monitoring module 380 can be implemented in hardware, firmware, software, or any combination thereof.

The monitoring module 380 resides on the client computer 320. The monitoring module 380 communicates with the proxy module 310 and provides instructions to the proxy module 310 as to what e-mails to block. In one embodiment, the proxy module 310 is a module that, while functionally separate from the monitoring module, resides with the monitoring module 380 on the client computer 320. In yet another embodiment, the proxy module 310 resides on a proxy computer separate from the client computer. As described herein and is apparent to one skilled in the relevant art, the functionality of the monitoring module 380 and the proxy module 310 can be distributed in any number of combinations throughout the computing environment while maintaining its functionality.

Although not required, method embodiments of the invention can be implemented via computer-executable instructions, such as routines executed by a general purpose computer, e.g., a server or client computer. The computer-executable instructions can reside on one or more computer-readable media, such as hard disks, floppy disks, optical drives, Compact Disks, Digital Video Disks, etc. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured, or constructed to perform at least one of the computer-executable instructions as explained herein. The invention can also be practiced in distributed computing environments where tasks or modules are performed by remote processing devices, which are linked through a communications network. In a distributed computing environment, program modules may be located in both local and remote memory storage devices. Indeed, the term "computer," as used generally herein, refers to any of the above devices and systems, as well as any data processor.

The above description is included to illustrate the operation of various embodiments of the invention and is not meant to limit the scope of the invention. The elements and steps of the various embodiments described above can be combined to provide further embodiments. The scope of the invention is to be limited only by the following claims. Accordingly, from the above discussion, many variations will be apparent to one skilled in the art that would yet be encompassed by the spirit and scope of the present invention.

What is claimed is:

1. A method for preventing the spread of malicious computer code, the method comprising:
    identifying a computer application that is data mining an e-mail address;
    determining whether the computer application associates at least one executable application and the data mined e-mail address with an e-mail message; and
    blocking transmission of the e-mail message when the e-mail message is associated with the at least one executable application and the data mined e-mail address.

2. The method of claim 1 further comprising the step of creating a notification that the transmission of the e-mail message has been blocked.

3. The method of claim 1 wherein data mining comprises opening a computer file.

4. The method of claim 3 wherein data mining further comprises extracting the e-mail address from the opened computer file.

5. The method of claim 3 wherein data mining further comprises extracting e-mail address data from the opened computer file.

6. The method of claim 1 wherein data mining comprises opening an EML file.

7. The method of claim 1 wherein data mining comprises opening a HTML file.

8. The method of claim 1 wherein data mining comprises opening a DBX file.

9. The method of claim 1 wherein data mining comprises recreating the e-mail address from e-mail address related data included in an opened computer file.

10. The method of claim 1 wherein the identifying step comprises monitoring for use of at least one search string by the computer application to search for computer files.

11. The method of claim 1 wherein the identifying step comprises comparing a file type of a computer file that the computer application is data mining to file types known to contain an e-mail address.

12. The method of claim 1 wherein the at least one executable application comprises a substantially similar copy of the computer application that is data mining.

13. The method of claim 1 wherein the at least one executable application contains malicious computer code.

14. A method for preventing the propagation of malicious computer code from a computer, the method comprising:
    determining whether a computer application is searching for a file containing electronic address information;

observing the computer application read the electronic address information from the file;

monitoring the computer application prepare an electronic message with the electronic address information;

detecting whether the computer application associates at least one executable application with the electronic message; and responsive to detecting the computer application associate at least one executable application with the electronic message, blocking transmission of the electronic message.

15. The method of claim 14 wherein the determining step comprises determining whether the computer application finds the file.

16. The method of claim 14 wherein the determining step comprises determining whether the computer application opens the file.

17. The method of claim 14 wherein the determining step comprises comparing the file to file types known to contain electronic address information.

18. The method of claim 14 wherein the executable application is a copy of the computer application.

19. The method of claim 14 wherein the executable application contains malicious computer code.

20. The method of claim 14 further comprising the step of creating a notice that transmission of the electronic messages has been blocked.

21. The method of claim 14 wherein electronic address information includes at least one e-mail address.

22. The method of claim 14 wherein observing further comprises extracting electronic address information from the file.

23. The method of claim 14 wherein electronic address information includes at least one instant message address.

24. At least one computer-readable medium containing computer program instructions for preventing the spread of malicious computer code, the computer program instructions performing the steps of:

identifying a computer application that is data mining an e-mail address from a computer file;

monitoring for the computer application preparing an e-mail message addressed to the data mined e-mail address and comprising at least one executable application; and responsive to the computer application creating the e-mail message addressed to the data mined e-mail address and comprising the at least one executable application, blocking the transmission of the e-mail message.

25. The at least one computer-readable medium of claim 24 wherein the computer program instructions further performs the step of creating a notification that the transmission of the e-mail message has been blocked.

26. The at least one computer-readable medium of claim 24 wherein data mining comprises opening the computer file.

27. The at least one computer-readable medium of claim 26 wherein data mining comprises extracting the e-mail address from the opened computer file.

28. The at least one computer-readable medium of claim 26 wherein data mining comprises extracting e-mail address data from the open computer file.

29. The at least one computer-readable medium of claim 28 wherein data mining comprises recreating the e-mail address from the extracted e-mail address data.

30. The at least one computer-readable medium of claim 24 wherein the identifying step further comprises monitoring for use of at least one search string by the computer application to search for computer files.

31. The at least one computer-readable medium of claim 24 wherein the identifying step further comprises comparing a file type of the computer file that the computer application is data mining to file types known to contain an e-mail address.

32. The at least one computer-readable medium of claim 24 wherein the at least one executable application comprises a substantially similar copy of the computer application that is data mining.

33. The at least one computer-readable medium of claim 24 wherein the at least one executable application contains malicious computer code.

34. Apparatus for preventing the spread of malicious computer code from a client computer to an e-mail server, the apparatus comprising:

a proxy module interposed between the client computer and the e-mail server, the proxy module comprising:

a monitor module adapted to identify a computer application that is data mining an e-mail address from the client computer and to determine whether the computer application associates at least one executable application and the data mined e-mail address with an e-mail message; and coupled to the monitor module, a blocking module adapted to block the transmission of the e-mail message when the e-mail message is associated with the at least one executable application and the data mined e-mail address.

35. The apparatus of claim 34 wherein the monitor module is further adapted to compare a file type of a computer file that the computer application is data mining to file types known to contain an e-mail address.

36. The apparatus of claim 34 wherein the proxy module and the monitor module reside on the client computer.

37. The apparatus of claim 36 wherein the blocking module resides on the client computer.

* * * * *